US012802311B2

(12) United States Patent
Wu et al.

(10) Patent No.: US 12,802,311 B2
(45) Date of Patent: Nov. 17, 2026

(54) METHOD FOR COMPUTED TOMOGRAPHY IMAGING AND RECONSTRUCTION BASED ON LEARNING

(71) Applicant: ZHEJIANG UNIVERSITY, Hangzhou (CN)

(72) Inventors: Hongzhi Wu, Hangzhou (CN); Kun Zhou, Hangzhou (CN); Kaizhang Kang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 216 days.

(21) Appl. No.: 18/777,615

(22) Filed: Jul. 19, 2024

(65) Prior Publication Data

US 2025/0014237 A1 Jan. 9, 2025

Related U.S. Application Data

(63) Continuation of application No. PCT/CN2023/102613, filed on Jun. 27, 2023.

(51) Int. Cl.
*G06T 12/00* (2026.01)

(52) U.S. Cl.
CPC .......... *G06T 12/00* (2026.01); *G06T 2210/41* (2013.01)

(58) Field of Classification Search
CPC ...... G06T 12/00; G06T 2210/41; G06T 12/20
See application file for complete search history.

(56) References Cited

FOREIGN PATENT DOCUMENTS

| | | | |
|---|---|---|---|
| CN | 110570503 | A | 12/2019 |
| CN | 111915733 | A | 11/2020 |
| CN | 112380764 | A | 2/2021 |
| CN | 112396560 | A | 2/2021 |
| CN | 113140033 | A | 7/2021 |
| CN | 114742966 | A | 7/2022 |
| CN | 115439341 | A | 12/2022 |
| WO | 2023004558 | A1 | 2/2023 |
| WO | 2023004560 | A1 | 2/2023 |

OTHER PUBLICATIONS

Rückert, Darius, et al. "Neat: Neural adaptive tomography." ACM Transactions on Graphics (TOG) 41.4 (2022): 1-13.*

(Continued)

*Primary Examiner* — Matthew C Bella
(74) *Attorney, Agent, or Firm* — Wiersch Law Group

(57) ABSTRACT

A method for computed tomography imaging and reconstruction based on learning, which measures the scene density distribution in an illumination multiplexing manner. The light source(s) for imaging emit(s) light according to the intensity obtained by pre-learning, and the light from different directions is absorbed and attenuated by the scene and reaches a sensor. The measured values are calculated and reconstructed to obtain the density information of the scene. The illumination intensity and reconstruction algorithm are learned by a neural network. In this method, the CT imaging process is modeled as a linear fully connected layer, and the weight corresponds to the illumination intensity of the light source for imaging; the reconstruction algorithm is modeled as a nonlinear neural network, which can be optimized according to the characteristics of scanning geometry.

10 Claims, 5 Drawing Sheets

(56) References Cited

OTHER PUBLICATIONS

Kang, Kaizhang, et al. "Differentiable dynamic visible-light tomography." SIGGRAPH Asia 2023 Conference Papers. (2023).*
International Search Report (PCT/CN2023/102613); Date of Mailing: Feb. 28, 2024.
Chinese Grant of Patent for Application No. 202310765902.3, mailed Apr. 9, 2026 (8 pages).

* cited by examiner

METHOD FOR COMPUTED TOMOGRAPHY IMAGING AND RECONSTRUCTION BASED ON LEARNING

CROSS-REFERENCE TO RELATED APPLICATIONS

The present application is a continuation of International Application No. PCT/CN2023/102613, filed on Jun. 27, 2023, the contents of which is incorporated herein by reference in its entirety.

TECHNICAL FIELD

The present disclosure relates to the technical field of Computed Tomography (CT), and in particular, to an imaging and reconstruction method.

BACKGROUND

Computed tomography (CT) is an important research direction in the fields of medical imaging and computer vision graphics. This technology can reconstruct the internal structure of the object by measuring the amount of light absorbed by the scene in different directions. This technology has a wide range of application scenarios, such as medical imaging, industrial monitoring, aviation security inspection and cultural relics protection.

In particular, it is of great scientific and application value to apply tomography technology to dynamic scenes. For example, mechanical inspection and medical diagnosis both require three-dimensional reconstruction of high-speed dynamic scenes. However, extending traditional CT to dynamic scenes faces a critical challenge: since high-quality reconstruction results are often based on intensive sampling in different directions, when the scene changes rapidly, the intensive sampling process must be completed in a short time to avoid the afterimage problem in reconstruction and ensure the reconstruction quality. This makes it necessary for dynamic scene-oriented CT to far exceed the high sampling ability of traditional methods.

Over the past decades, various studies have proposed different algorithms for CT acquisition and reconstruction of dynamic scenes. For a specific dynamic phenomenon, the properties of the observed scene can be used for solution. For example, Chen et al. proposed a scanning reconstruction algorithm (Chen Guang-Hong, Theriault-Lauzier Pascal, Tang Jie, Nett Brian, Leng Shuai, Zambelli Joseph, Qi Zhihua, Bevins Nicholas, Raval Amish, Reeder Scott. 2011. Time-resolved interventional cardiac C-arm cone-beam CT: An application of the PICCS algorithm. IEEE transactions on medical imaging. 31, 4, 907-923). However, such methods are limited to specific scene characteristics and lack universality. Some studies aim to improve sampling speed by reducing the number of point light source samples and making strong prior assumptions for reconstruction. However, the dependence on these assumptions limits the applicability of the methods to certain scenarios (Zang Guangming, Idoughi Ramzi, Wang Congli, Bennett Anthony, Du Jianguo, Skeen Scott, Roberts William L., Wonka Peter, Heidrich Wolfgang. 2020. TomoFluid: reconstructing dynamic fluid from sparse view videos. Proceedings of the IEEE/CVF Conference on Computer Vision and Pattern Recognition. 1870-1879). Therefore, it is urgent to propose a computed tomography acquisition and reconstruction algorithm for general dynamic scenes.

SUMMARY

The present disclosure aims at solving the problems that the existing computed tomography scanning method has insufficient acquisition ability in dynamic scenes and a strong prior assumption is required for reconstruction, and provides a method which greatly improves the acquisition ability and is oriented to general scenes.

In order to achieve the above object, the present disclosure provides a method for computed tomography imaging and reconstruction based on learning, which measures the scene density distribution in an illumination multiplexing manner, including the following steps:

(1) Generating training data, including: acquiring parameters of a scanning device, including spatial positions of light sources and sensors, and readings of all sensors by iteratively turning on all light sources with maximum intensity in an empty scene; and generating, by using the parameters, computed tomography (CT) images when a single light source emits light emitted through a scene and reaches the sensors, as the training data.

(2) Training a neural network according to the training data generated in the step (1). The neural network has the following characteristics:

a, the CT images of all light sources of the scanning device are taken as an input;

b, a corresponding density field is taken as an output.

c, a first layer of the neural network is a linear fully connected layer, and a parameter matrix of the linear fully connected layer is obtained by the following formula:

$$W_l = f_w(W_{raw})$$

where $W_{raw}$ represents a parameter to be trained; $W_l$ corresponds to an illumination intensity matrix during imaging, with a size of $k \times n_s$, $n_s$ represents a number of light sources of the scanning device, and k represents a number of samples; and $f_w$ represents a mapping, and is configured for transforming $W_{raw}$, so that the generated illumination intensity matrix $W_l$ corresponds to a possible illumination intensity of the light sources;

d, a second layer and subsequent layers are nonlinear neural networks, and the output of a last layer is a density field reconstruction result; and after training is completed, the illumination intensity matrix $W_l$ of the first linear fully connected layer is extracted.

(3) emitting, by the light sources of the scanning device, light line by line according to the illumination intensity matrix extracted in the step (2), and irradiating a target scene in turn, and obtaining, by the sensors, a measurement value matrix M, with a size of $k \times n_d$, where $n_d$ represents a number of the sensors; calculating a reconstructed density field by taking M as an output of the first linear fully connected layer of the neural network; measuring, based on the pre-learned illumination intensity matrix, a scene density distribution, using an illumination multiplexing manner; reconstructing, based on acquired measurements, scene density distribution for dynamic scenes; and generating, based on the scene density distribution, CT images for dynamic scenes.

Further, in the step (1), the method of generating the CT images further includes: randomly placing several objects with different densities in an effective area of the scene, and generating the CT images based on a selected ray model according to positions of the light sources and sensors obtained by calibration.

Further, the ray model is a linear absorption model, with an equation as follows:

$$I = e^{-K \times_3 x} \odot \tilde{I}$$

where I represents a matrix composed of the CT images of different light sources, with a size of $n_s \times n_d$, an element $I_{ij}$ in I represents a reading of a $j^{th}$ sensor when a $i^{th}$ light source emits light at a maximum intensity in a given density field, x represents a vector after the density field is discretized into voxels, with a length being a number of the voxels $n_v$, K represents a Radon transform represented by a third-order tensor, $\times_3$ represents a mode-3 product of the tensor and the vector, $\odot$ represents an element-by-element multiplication between matrices, and $\tilde{I}$ represents I when the density field is 0 everywhere.

Further, in the step (2), a relationship between the linear fully connected layer and the input is as follows:

$$M = W_l I$$

where I represents a matrix composed of the CT images of different light sources, with a size of $n_s \times n_d$.

Further, in the step (2), the neural network for reconstruction is expressed as follows:

$$x_{nn} = f_{recon}(D_{nn}) = f_{recon}(f_{nn}(M))$$

where M is mapped into Sinogram $D_{nn}$ by $f_{nn}$, and a density field reconstruction result $x_{nn}$ is obtained by using a computed tomography reconstruction method $f_{recon}$.

Further, the computed tomography reconstruction method is realized by using a filtered back projection method.

Further, in the step (2), a loss function $\mathcal{L}$ used for training is expressed as follows:

$$\mathcal{L} = \lambda_r \mathcal{L}_r + \lambda_p \mathcal{L}_p$$

$$\mathcal{L}_p = g_w(W_l)$$

where $\mathcal{L}_r$ is used to evaluate a density field reconstruction quality, $\mathcal{L}_p$ is used to allow the illumination intensity to have a specific property, $g_w$ represents a function adopted for evaluating the property of the illumination intensity, and $\lambda_r$ and $\lambda_p$ are used to balance the weights between different loss functions.

Further, the loss function $\mathcal{L}_r$ for evaluating the density field reconstruction quality can be expressed as:

$$\mathcal{L}_r = \|x_{nn} - x\|_2$$

Further, the function $g_w$ for actually evaluating the property of the illumination intensity can be designed according to different scenes, and the following two design methods are given, but not limited thereto:

I, for a dynamic scene requiring high-speed scanning, $g_w(W_l) = -\Sigma|W_l|$, so that a value of $W_l$ tends to be binary.

II, for a scene requiring low-dose scanning, $g_w(W_l) = \Sigma|W_l|$, so that the value of $W_l$ tends to be minimized.

The present disclosure has the beneficial effects that the computed tomography imaging and reconstruction method of illumination multiplexing is obtained through learning. Compared with traditional computed tomography methods for dynamic scenes, which are mainly designed for setups using point light source, the method according to embodiments of the present disclosure can sample in all ray spaces, thereby greatly improving the acquisition efficiency. Thanks to the processor to implement the method, the density field can be reconstructed without strong prior assumptions. Therefore, the method is suitable for general scenes. Compared with the traditional illumination multiplexing imaging method, in the method according to embodiments of the present disclosure, the processor can use a neural network to acquire the used illumination intensity and reconstruction algorithm, thereby greatly reducing the required number of inputs, and achieving the high quality reconstruction. The proposed computed tomography method can collect and reconstruct dynamic scenes, which cannot be implemented by the traditional methods under the same hardware conditions. In addition, this method is not limited to a specific scanning device, and thus has great value of general applicability.

DESCRIPTION OF EMBODIMENTS

In order to make the purpose, technical solution and advantages of the present disclosure more clear, the present disclosure will be further described in detail with the attached drawings and specific embodiments.

Figure 1:
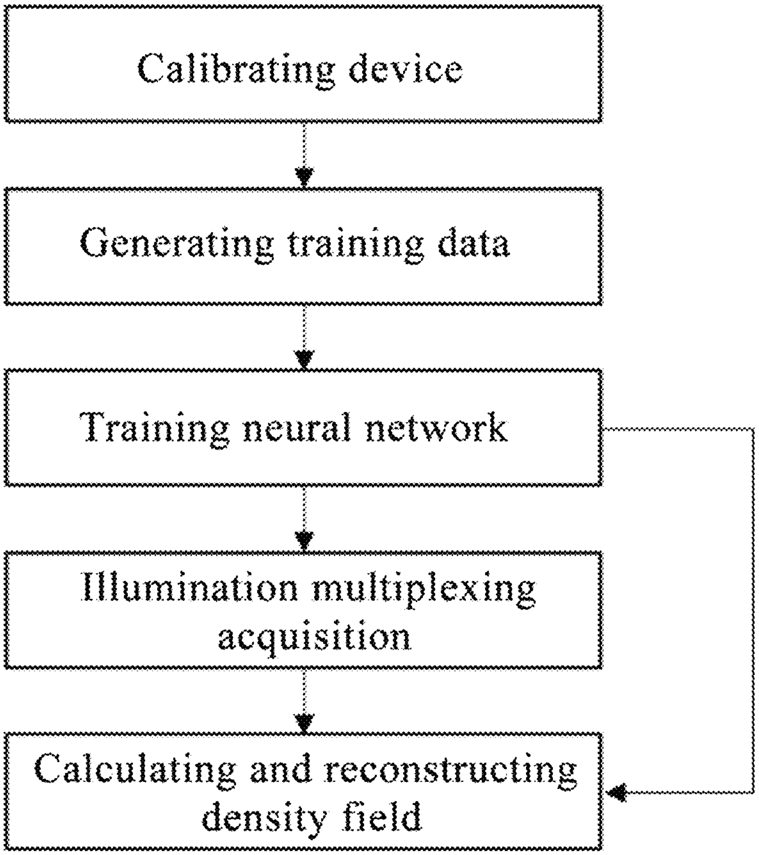
FIG. 1 is a schematic flow chart of illumination multiplexing imaging reconstruction based on learning.

The present disclosure provides a method for computed tomography imaging and reconstruction based on learning, which measures the scene density distribution in an illumination multiplexing manner. The steps are shown in FIG. 1, and are explained in detail as follows:

(1) Training data generation: parameters of a scanning device and readings of all sensors by iteratively turning on all light sources with maximum intensity in an empty scene are acquired. The parameters include spatial positions of light sources and sensors. These parameters are used to generate CT images generated when a single light source emits light emitted through a scene and reaches the sensors, as the training data.

In an embodiment, the scanning device includes at least two light sources and at least one sensor, each sensor can receive light from a plurality of light sources at the same time, and the intensities of all light sources are adjustable; the target scene is in part or all of the light path formed by the light source and the sensor.

Figure 2:
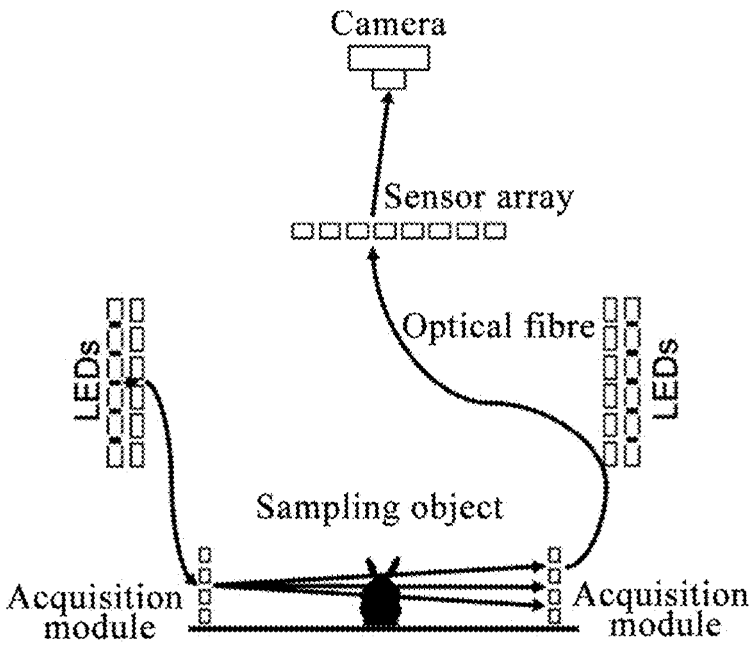
FIG. 2 is a side view of a scanning device used in an embodiment.
Figure 3:
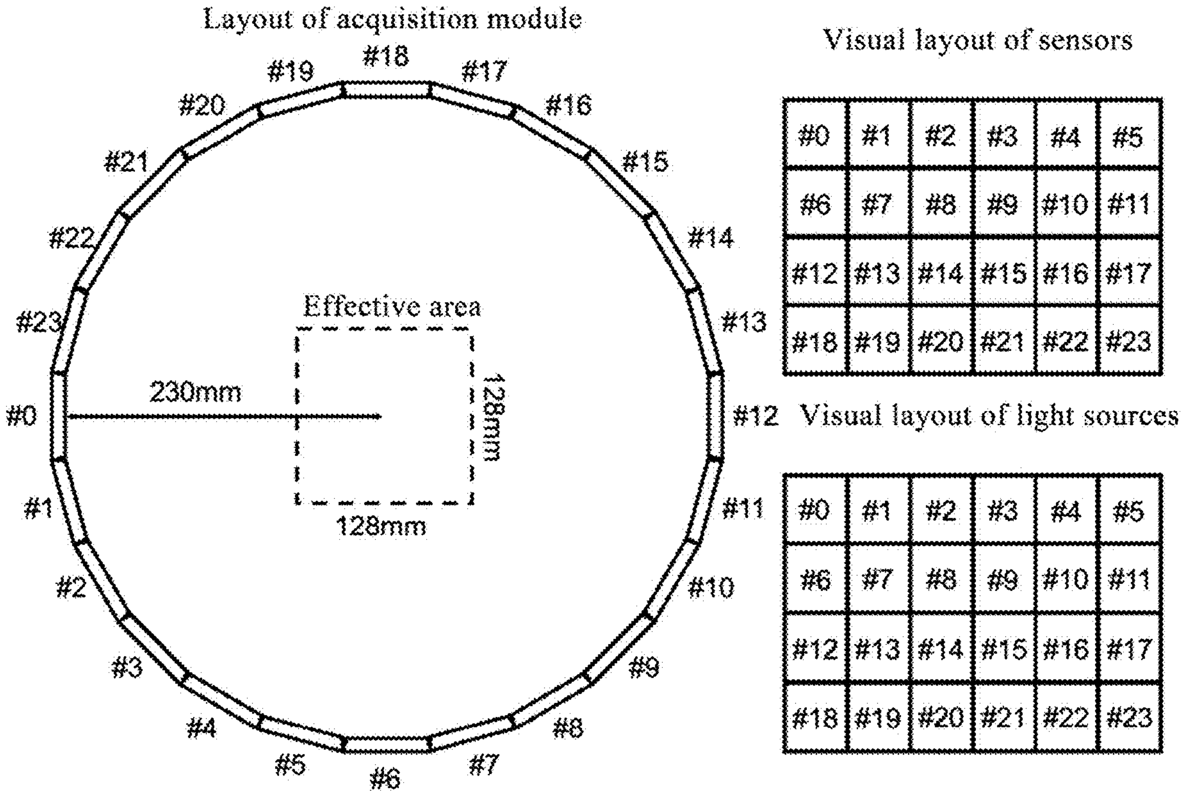
FIG. 3 is a top view and a visual layout of an acquisition module of the scanning device used in an embodiment.
Figure 4:
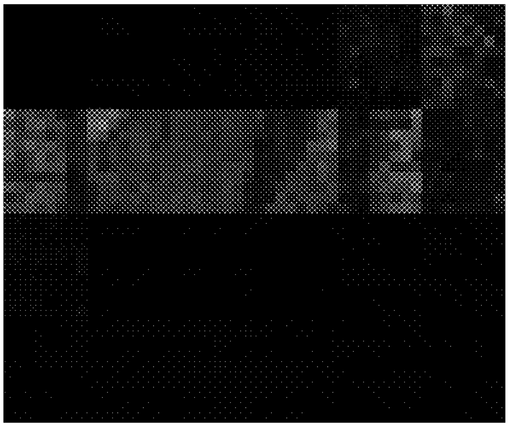
FIG. 4 is a CT image generated by a specific light source using training data in an embodiment.
Figure 5:
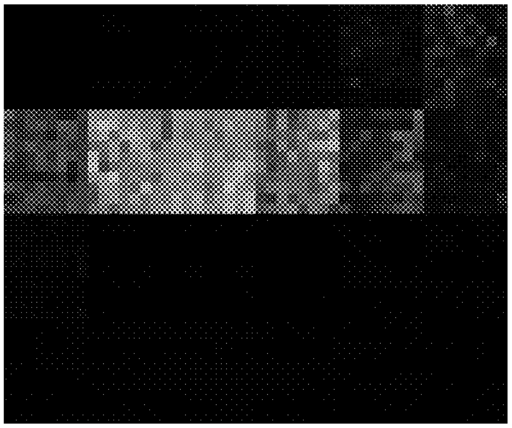
FIG. 5 is a CT image of a specific light source in an empty scene in an embodiment.

In one embodiment, the scene is detected by visible light, and FIG. 2 shows a side view of the scanning device used. The optical fiber is used to transmit the light emitted by the LED array to an acquisition module as the light source. After receiving the light, a receiver part of the acquisition module further use the optical fiber to transmit the light to the sensor array, and the camera above takes photos. FIG. 3 shows the top view and visual layout of the acquisition modules. In this embodiment, 24 acquisition modules are connected in a ring shape in turn, numbered as #0, #1, . . . , #23, and each acquisition module has 10 rows and 16 columns, with odd columns as light sources and even columns as sensors. The size of the effective acquisition area is 32 mm×128 mm×128 mm, and the corresponding voxel resolution is 32×128×128. FIG. 4 and FIG. 5 are CT images generated by using a single light source in the scanning device when there are objects and when there is an empty scene, respectively.

Different ray models can be selected to generate CT images. In this embodiment, a linear absorption model is selected, but it is not limited to this. The formula of the linear absorption model is as follows:

$$I = e^{-K \times_3 x} \odot \tilde{I}$$

where I is a matrix composed of the CT images of different light sources, with a size of $n_s \times n_d$, an element $I_{ij}$ in I is a reading of a $j^{th}$ sensor when a $i^{th}$ light source emits light at a maximum intensity in a given density field, x is a vector after the density field is discretized into voxels, with a length being a number of the voxels $n_v$, K is a Radon transform represented by a third-order tensor, $x_3$ is a mode-3 product of the tensor and the vector, $\odot$ is an element-by-element multiplication between matrices, and $\tilde{I}$ is I when the density field is 0 everywhere; the element $\tilde{I}_{ij}$ in $\tilde{I}$ is a reading of the $j^{th}$ sensor when the $i^{th}$ light source emits light at a maximum intensity in the empty scene.

Figure 6:
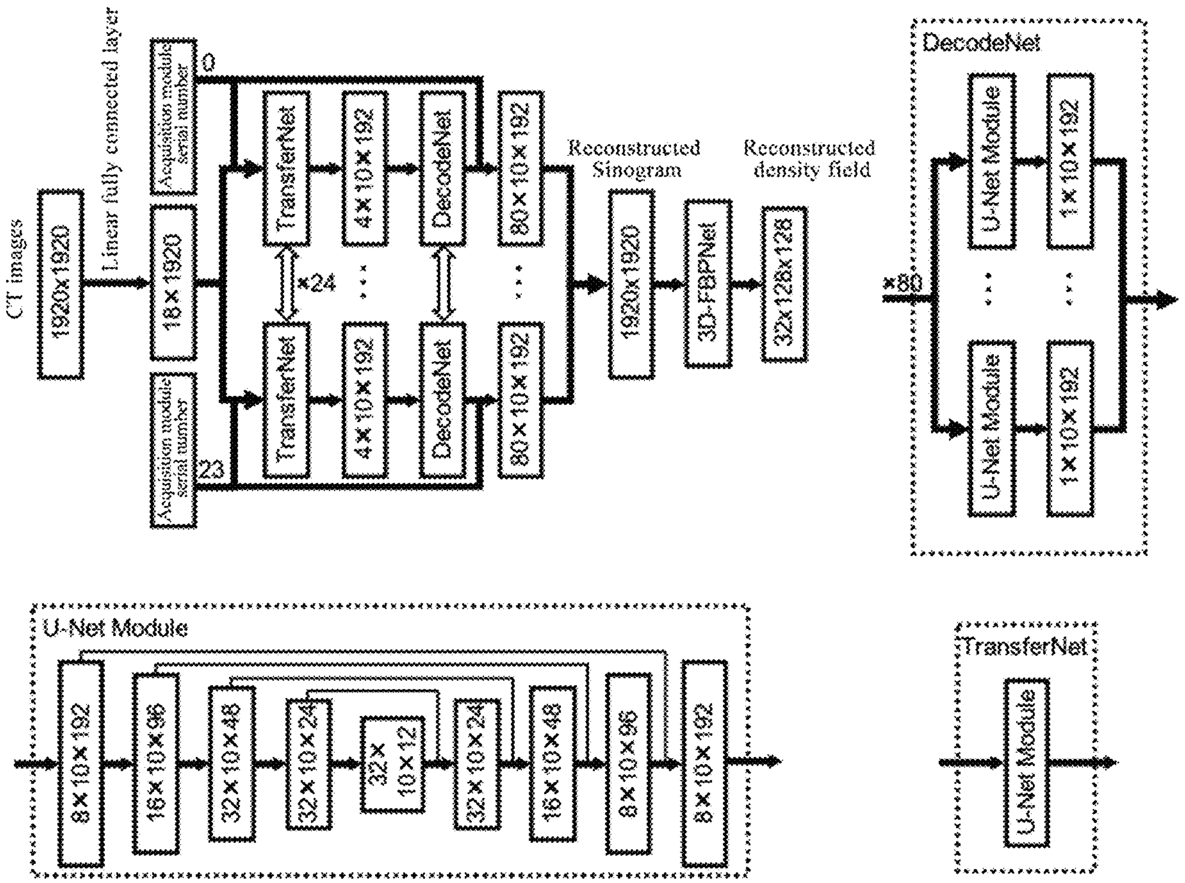
FIG. 6 is a schematic diagram of the network structure in an embodiment.

(2) The neural network is trained according to the training data generated in step (1). The neural network used in this embodiment is shown in FIG. 6, but it is not limited thereto, and the black arrow in the figure indicates the convolution layer unless otherwise specified. The specific description of the neural network used is as follows:

a, the CT images of all light sources of the scanning device are taken as an input.

b, a corresponding density field is taken as an output.

c, a first layer of the neural network is a linear fully connected layer, and a parameter matrix of the linear fully connected layer is obtained by the following equation:

$$W_l = f_w(W_{raw})$$

where $W_{raw}$ is a parameter to be trained; $W_l$ corresponds to an illumination intensity matrix during imaging, with a size of $k \times n_s$, $n_s$ is a number of light sources of the scanning device, and k is a number of samples; $f_w$ is a mapping, which is used for transforming $W_{raw}$, so that the generated illumination intensity matrix $W_l$ can correspond to a possible illumination intensity of the light sources; in this embodiment, a Sigmoid function is selected for $f_w$ to transform $W_{raw}$ to [0,1], so that the elements of $W_l$ have practical physical significance; and the relationship between the linear fully connected layer and the input is as follows:

$$M = W_l I$$

where M represents a measured value matrix of the sensor.

d, a second layer and subsequent layers are nonlinear neural networks, and the output of a last layer is a density field reconstruction result. After training is completed, the illumination intensity matrix $W_l$ of the first linear fully connected layer is extracted.

In an embodiment, the neural network used for reconstruction is expressed as follows:

$$x_{nn} = f_{recon}(D_{nn}) = f_{recon}(f_{nn}(M))$$

where M is mapped into Sinogram Dnn by fnn, and then using a Computed Tomography reconstruction method frecon to obtain a density field reconstruction result xnn is obtained by using a computed tomography reconstruction method frecon.

In this embodiment, the measured value matrix is divided into 24 sub-matrices according to the acquisition modules, and the sub-matrix with the acquisition module serial number of $G_i$ is shifted to the left by $G_i \times 8$ pixels in rows, so that all sub-matrices share the same parameterized form to take advantage of the rotation invariance of the scanning geometry in this embodiment. The moved measurement matrix is reconstructed by 24 decoding networks sharing parameters to obtain the sinogram of each acquisition module, which is assembled into the reconstructed sinogram after the serial number of the acquisition module is moved back to the original position. Finally, the density field is reconstructed from the differentiable 3D-FBPNet. It should be noted that the network structure shown here is the technical solution of one embodiment of the present disclosure, but not the limitation. The loss function $\mathcal{L}$ for training can be expressed as follows:

$$\mathcal{L} = \lambda_r \mathcal{L}_r + \lambda_p \mathcal{L}_p$$

$$\mathcal{L}_r = \|x_{nn} - x\|_2$$

$$\mathcal{L}_p = g_w(W_l)$$

where $\mathcal{L}_r$ is used to evaluate a density field reconstruction quality, $\mathcal{L}_p$ is used to allow the illumination intensity to have a specific property, $g_w$ represents a function adopted for evaluating the property of the illumination intensity, and $\lambda_r$ and $\lambda_p$ are used to balance the weights between different loss functions. $\lambda_r$ and $\lambda_p$ are preferably 1.0 and 1e−5.

In order to improve the scanning speed, the illumination intensity should be encouraged to increase, therefore $g_w$ is preferably:

$$g_w(W_l) = -\sum |W_l|$$

(3) The light source of the scanning device emits light line by line according to the illumination intensity matrix taken out in step (2). The a target scene are irradiated in turn, and the measured value matrix M is obtained through the sensors, with a size of $k \times n_d$, $n_d$ is the number of sensors. The reconstructed density field is calculated by taking M as the output of the first linear fully connected layer of the neural network.

Corresponding to the embodiment of the method for computed tomography imaging and reconstruction based on learning, the present disclosure further provides an embodiment of a learning-based Computed Tomography imaging and reconstruction apparatus.

The learning-based Computed Tomography imaging and reconstruction apparatus provided by the embodiment of the present disclosure comprises a memory and one or more processors. The memory stores executable codes, and when the executable codes are executed by the processors, the method for computed tomography imaging and reconstruction based on learning in the embodiment is implemented.

The embodiment of the learning-based Computed Tomography imaging and reconstruction apparatus of the present disclosure can be applied to any device with data processing capability, which can be a device or device such as a computer. The embodiment of the apparatus can be realized by software, or by hardware or a combination of hardware and software. Taking software implementation as an example, as a logical device, it is formed by reading the corresponding computer program instructions in the non-volatile memory into the memory through the processor of any equipment with data processing capability. In the hardware level, in addition to the processor, memory, network interface, and nonvolatile memory, any device with data processing capability where the apparatus in the embodiment is located may further include other hardware according to the actual function of the device with data processing capability, which will not be described here again.

The embodiment of the present disclosure further provides a computer-readable storage medium, on which a program is stored, which, when executed by a processor, implements the method for computed tomography imaging and reconstruction based on learning in the above embodiment.

The computer-readable storage medium can be an internal storage unit of any device with data processing capability as described in any of the previous embodiments, such as a hard disk or a memory. The computer-readable storage medium can further be an external storage device of any device with data processing capability, such as a plug-in hard disk, Smart Media Card (SMC), SD card, Flash Card and the like provided on the device. Further, the computer-readable storage medium can further include both internal storage units and external storage devices of any device with data processing capability. The computer-readable storage medium is used for storing the computer program and other programs and data required by any device with data processing capability, and can further be used for temporarily storing data that has been output or will be output. The above is only the preferred embodiment of one or more embodiments of this specification, and it is not intended to limit one or more embodiments of this specification. Any modification, equivalent substitution, improvement and the like made within the spirit and principle of one or more embodiments of this specification shall be included in the protection scope of one or more embodiments of this specification.

What is claimed is:

1. A method for computed tomography imaging and reconstruction based on learning, wherein the method is implemented by at least one processor caused by instructions stored in a memory, the instructions cause the at least one processor, and the method comprises the following steps:

step (1) generating training data, comprising:

acquiring parameters of a scanning device, wherein the parameters comprise spatial positions of light sources and sensors, and readings of all sensors by iteratively turning on all light sources with a maximum intensity in an empty scene; and generating, by the parameters, computed tomography (CT) images when a single light source emits light emitted through a scene and reaches the sensors, as the training data;

step (2) training a neural network according to the training data generated in the step (1), wherein the neural network has the following characteristics:

a, the CT images of all the light sources of the scanning device are taken as an input;

b, a corresponding density field is taken as an output;

c, a first layer of the neural network is a linear fully connected layer, and a parameter matrix of the linear fully connected layer is obtained by a following equation:

$$W_l = f_w(W_{raw}),$$

where $W_{raw}$ represents a parameter to be trained; $W_l$ corresponds to an illumination intensity matrix during imaging, with a size of $k \times n_s$, $n_s$ represents a number of light sources of the scanning device, and k represents a number of samples; and $f_w$ represents a mapping and is configured to transform $W_{raw}$, so that the generated illumination intensity matrix $W_l$ corresponds to a illumination intensity of the light sources; and d, a second layer and subsequent layers are nonlinear neural networks, and the output of a last layer is a density field reconstruction result; and after training is completed, the illumination intensity matrix $W_l$ of the linear fully connected layer is extracted; and step (3) emitting, by the light sources of the scanning device, light line by line according to the illumination intensity matrix extracted in the step (2), irradiating a target scene in turn, and obtaining, by the sensors, a measurement value matrix M, with a size of $k \times n_d$, where $n_d$ represents a number of the sensors; and calculating a reconstructed density field by taking M as an output of the linear fully connected layer of the neural network;

measuring, based on the illumination intensity matrix $W_l$ extracted in the step (2), a scene density distribution, using an illumination multiplexing manner;

reconstructing, based on acquired measurements, scene density distribution for dynamic scenes; and generating, based on the scene density distribution, CT images for dynamic scenes.

2. The method according to claim 1, wherein said generating the CT images in the step (1) further comprises: randomly placing several objects with different densities in an effective area of the scene, and generating the CT images based on a selected ray model according to positions of the light sources and sensors obtained by calibration.

3. The method according to claim 2, wherein the ray model is a linear absorption model, with an equation as follows:

$$I = e^{-K \times_3 x} \odot \tilde{I},$$

where I represents a matrix comprising the CT images of different light sources, with a size of $n_s \times n_d$, an element $I_{ij}$ in I represents a reading of a $j^{th}$ sensor when a $i^{th}$ light source emits light at a maximum intensity in a given density field, x represents a vector after the density field is discretized into voxels, with a length being a number of the voxels $n_v$, K represents a Radon transform represented by a third-order tensor, $\times_3$ represents a mode-3 product of the tensor and the vector, $\odot$ represents an element-by-element multiplication between matrices, and $\tilde{I}$ represents I when the density field is 0 everywhere.

4. The method according to claim 1, wherein in the step (2), a relationship between the linear fully connected layer and the input is expressed by a following equation:

$$M = W_l I,$$

where I represents a matrix comprising the CT images of different light sources, with a size of $n_s \times n_d$.

5. The method according to claim 1, wherein in the step (2), the neural network for reconstruction is expressed as follows:

$$x_{nn} = f_{recon}(D_{nn}) = f_{recon}(f_{nn}(M)),$$

wherein M is mapped into Sinogram $D_{nn}$ by $f_{nn}$, and a density field reconstruction result $x_{nn}$ is obtained by using a computed tomography reconstruction method $f_{recon}$.

6. The method according to claim 5, wherein the computed tomography reconstruction method is realized by using a filtered back projection.

7. The method according to claim 1, wherein in the step (2), a loss function L for training is expressed as follows:

$$\mathcal{L} = \lambda_r \mathcal{L}_r + \lambda_p \mathcal{L}_p,$$

$$\mathcal{L}_p = g_w(W_l),$$

where $L_r$ is used to evaluate a density field reconstruction quality, $L_p$ is used to allow the illumination intensity to have a specific property, $g_w$ represents a function adopted for evaluating the property of the illumination intensity, and $\Delta_r$ and $\Delta_p$ are used to balance weights between different loss functions.

8. The method according to claim 7, wherein a loss function $L_r$ is calculated by $L_r = \|x_{nn} - x\|_2$, where x represents a vector after the density field is discretized into voxels, and $x_{nn}$ represents a density field reconstruction result.

9. The method according to claim 7, wherein in a dynamic scene requiring high-speed scanning, $g_w(W_l) = -\Sigma|W_l|$, so that a value of $W_l$ tends to be binary.

10. The method according to claim 7, wherein in a scene requiring low-dose scanning, $g_w(W_l) = \Sigma|W_l|$, so that a value of $W_l$ tends to be minimized.

* * * * *